United States Patent
Sokolihs et al.

(10) Patent No.: US 11,268,567 B2
(45) Date of Patent: Mar. 8, 2022

(54) SEALING ELEMENT FOR A BALL-AND-SOCKET JOINT

(71) Applicants: ZF Friedrichshafen AG, Friedrichshafen (DE); ZF GAINESVILLE LLC, Gainesville, GA (US)

(72) Inventors: Dirk Sokolihs, Porta Westfalica (DE); Uwe Petersen, Espelkamp (DE); Joe Vierthaler, Gainesville, GA (US); Marco Di Sarno, Osnabrück (DE); Holger Hardt, Geeste (DE)

(73) Assignees: ZF Friedrichshafen AG, Friedrichshafen (DE); ZF Gainsville, LLC, Gainsville, GA (US)

( * ) Notice: Subject to any disclaimer, the term of this patent is extended or adjusted under 35 U.S.C. 154(b) by 503 days.

(21) Appl. No.: 16/216,099

(22) Filed: Dec. 11, 2018

(65) Prior Publication Data

US 2020/0182288 A1    Jun. 11, 2020

(51) Int. Cl.
*F16C 11/06* (2006.01)

(52) U.S. Cl.
CPC ........ *F16C 11/0671* (2013.01); *F16C 11/068* (2013.01); *F16C 11/069* (2013.01); *F16C 2361/41* (2013.01)

(58) Field of Classification Search
CPC . F16C 11/0628; F16C 11/0671; F16C 11/068; F16C 2326/05; F16C 2326/24; F16C 11/069; F16C 2326/41; F16J 3/046; Y10T 403/32729; Y10T 403/315
See application file for complete search history.

(56) References Cited

U.S. PATENT DOCUMENTS

| | | | | |
|---|---|---|---|---|
| 2,871,025 A | * | 1/1959 | Neher | F16C 11/0614 280/124.141 |
| 3,208,290 A | * | 9/1965 | Thomas | F16C 11/0671 403/38 |
| 3,391,952 A | * | 7/1968 | Zeigler | F16C 11/0671 403/51 |
| 3,476,417 A | * | 11/1969 | Born | F16C 11/0671 403/134 |
| 4,712,940 A | * | 12/1987 | Wood, Jr. | F16C 11/083 403/122 |
| 6,308,959 B1 | * | 10/2001 | Sokolihs | F16J 3/046 277/394 |
| 7,704,007 B2 | * | 4/2010 | Elterman | F16J 3/046 403/134 |

(Continued)

FOREIGN PATENT DOCUMENTS

DE   10 2017 202 410 A1   8/2018

*Primary Examiner* — Matthew R McMahon
(74) *Attorney, Agent, or Firm* — Finch & Maloney, PLLC; Michael Bujold; Jay Franklin (57) ABSTRACT

A sealing element for a ball joint has a sealing area on the housing side and a sealing area a distance away therefrom in an axial direction of the sealing element on the stud side. Arranged between the housing-side sealing area and the stud-side sealing area is an outlet opening which extends through the sealing element to allow the passage of spent lubricant. The outlet opening extends in the axial direction of the sealing element, passing all the way through the sealing element in the axial direction. Further, the sealing element is incorporated in a ball joint which is incorporated in a two-point control arm.

18 Claims, 5 Drawing Sheets

(56) References Cited

U.S. PATENT DOCUMENTS

| | | | | |
|---|---|---|---|---|
| 7,862,250 B2* | 1/2011 | Kuru | ............ | F16C 11/0671 403/134 |
| 2020/0056651 A1* | 2/2020 | Sokolihs | ............ | F16C 11/0671 |

* cited by examiner

SEALING ELEMENT FOR A BALL-AND-SOCKET JOINT

FIELD OF THE INVENTION

The invention relates to a sealing element for a ball joint and a ball joint with such a sealing element, as well as to a two-point control arm with such a ball joint.

BACKGROUND OF THE INVENTION

Sealing elements for ball joints of chassis components or steering components in motor vehicles, especially in utility vehicles, are known from the prior art. By means of such sealing elements, in the fitted condition an annular gap is sealed between a ball-stud opening in a ball joint housing and a ball stud, so preventing the leakage of lubricant out of the ball joint housing and at the same time preventing any undesired penetration of contaminants into the ball joint housing. Sealing elements of ball joints can have lubricant outlet openings out of which spent lubricant contaminated by wear particles and/or in other ways can drain away. Such lubricant outlet openings, which are as a rule found in sealing elements of ball joints that can be lubricated, are often designed and/or in an assembled condition arranged in such manner that spent lubricant can emerge in one direction. This happens as a rule by pressing fresh lubricant into the ball joint housing, for example through a lubrication nipple. On the other hand, by virtue of a valve-like structure of the lubricant outlet openings, either as such or due to interaction with neighboring components in an assembled condition, any penetration of dirt and/or moisture into the ball joint housing in a second direction opposite to the first direction is prevented.

A sealing element known as a sealing bellows with such a lubricant outlet opening is known from DE 10 2017 202 410 A1. The sealing element, which is suitable for a lubricated ball joint, has a sealing area on the housing side and a sealing area axially a distance away therefrom on the stud side, and an outlet opening arranged between the sealing area on the housing side and the sealing area on the stud side which therefore extends through a wall of the sealing element. The outlet opening, which is directed in a radial direction extending perpendicularly to the axial direction, opens into a blind-hole-like pocket which is formed on an inside of the sealing element in its wall and extends in the axial direction of the sealing element. In the pre-assembled condition of the sealing element the outlet opening itself is in the form of an open slit with a slit dimension of a few tenths of a millimeter. The valve-like action mentioned earlier for preventing unwanted penetration of contaminants to the inside of the ball joint is achieved in an assembled condition in that the outlet opening is pressed together. The sealing element is produced by primary forming, for example in an injection molding die. In that case die elements that can move in the axial direction of the sealing element co-operate with die elements that can move in the radial direction of the sealing element. To be able to ensure process reliability in the context of mass production and that the passage between the outlet opening and the pocket is permanently open, and at the same time that there is no collision between the die elements involved, relatively great die-technological complexity is demanded.

SUMMARY OF THE INVENTION

The purpose of the present invention is to provide a sealing element for a ball joint, which has an outlet opening that allows the passage of spent lubricant, wherein even under mass production conditions the outlet opening can be produced by a reliable process but at the same time with relatively little die-technological complexity. A further purpose of the invention is to provide an alternative design form.

According to the present invention, this objective is achieved by a sealing element having the characteristics specified in the independent claims.

Preferred embodiments and further developments are the object of the subordinate claims. Further features and details of the invention emerge from the description and the figures in the drawing.

Accordingly, the invention provides a sealing element for a ball joint wherein the sealing element has a sealing area on the housing side and a sealing area a distance away therefrom in the axial direction of the sealing element on the stud side, and arranged between the sealing area on the housing side and the sealing area on the stud side an outlet opening which therefore passes through the sealing element and through which spent lubricant can emerge. According to the invention, the outlet opening extends in the axial direction of the sealing element and passes completely through the sealing element in its axial direction. In particular the ball joint is a ball joint that can be lubricated, or a maintenance-free ball joint with life-long lubrication, or a ball joint with lengthy maintenance intervals. In particular the ball joint is suitable for a chassis of a motor vehicle; for example a utility vehicle for the transport of people and/or goods or a self-driving agricultural or forestry machine or a self-driving building machine.

In particular, the outlet opening extends in a straight line in the axial direction of the sealing element. Since in this case the outlet opening therefore passes completely through the sealing element in its axial direction, the outlet opening can be produced by a primary forming process, for example an injection molding process, with a single die element which is in the form of a pin and can move in the axial direction of the sealing element. Thus, in connection with the production of the outlet opening no particularly great die-technological complexity is needed when making such an injection molding die. In this context an outlet opening is understood to be a circumferentially closed cavity with a material-free space that is completely enclosed by the material of the sealing element and is suitable for allowing the passage of spent lubricant. In particular the outlet opening is a through-going opening. In particular the outlet opening extends in the axial direction of the sealing element and passes completely through the sealing element in its axial direction, in such manner that if the sealing element is viewed in the axial direction one can see through the outlet opening. In particular, the inside circumferential surface of the outlet opening is not machined. In particular, the outlet opening is produced by primary forming.

In particular, both in a disassembled condition of the sealing element and in an assembled condition in which the sealing element forms part of a ball joint and in turn the latter is fitted into a chassis of a motor vehicle, the outlet is open. In this way, during the process of assembling the sealing element while the sealing area on the housing side is being pushed onto a housing of the ball joint and at the same time the sealing area on the stud side is being fitted over a ball stud of the ball joint, any entrapped air can escape through the outlet opening. If such air escape were not possible, the entrapped air could be compressed and this would carry the risk that due to this compressed air lubricant could be forced in an uncontrolled manner out of the inside space of the ball joint filled with lubricant. Because of this, areas or surfaces of the ball joint or adjacent components could unintentionally be wetted with lubricant. For example it is undesirable to wet a conical connecting section of the ball joint with lubricant, because this would unacceptably reduce the coefficient of friction of a ball joint between the conical connecting section of the ball stud and a component connected to the stud. This can have the result that the ball joint is no longer able to transmit forces and/or torques determined on the basis of an unlubricated ball joint.

In particular, the sealing element is at least essentially of rotationally symmetrical design. In particular the sealing area on the housing side is rotationally symmetrical. In particular the sealing area on the stud side is rotationally symmetrical. In particular the sealing element has a plurality of outlet openings distributed, particularly uniformly, around the circumference. In particular, the sealing element is a sealing element for a ball joint and expressly not a sealing sleeve for rotating drive elements such as constant-velocity joints, cardan shafts, driveshafts or the like. The sealing element preferably consists of a plastic material with elastic properties such as a thermoplastic elastomer (TPE), polypropylene (PP) or ethylene propylene diene rubber (EPDM), Alternatively the sealing element can also be made from several different materials.

Preferably, the outlet opening extends in the axial direction of the sealing element essentially from the sealing are on the housing side to the sealing area on the stud side. In this way spent lubricant can already make its way from relatively close to the joint ball of the ball stud into the outlet opening. This is advantageous because during driving operation the spent lubricant is mainly produced at the surface of the joint ball and therefore has only a small distance to traverse to get to the outlet opening. In particular, at the axial level of the sealing area on the housing side the outlet opening has a larger cross-section than at the axial level of the sealing area on the stud side. Thus, the spent lubricant can run into the outlet opening almost as if it were a funnel.

Advantageously, the outlet opening is in the shape of a slim truncated cone or pyramid (frustum). The truncated cone or pyramid shaped design is necessitated by the production method. To be able to remove the sealing element from its mold after an injection molding process demolding inclines also known as draft angles are required. A customary draft angle is usually between 1 and 5 degrees relative to the axial direction, which also results in a relatively slim shape of the outlet opening. The truncated pyramid can if desired have a footprint that deviates from circularity. If the outlet opening is in the form of a slim truncated cone, at the level of the sealing area on the housing side its diameter is, for example, 3 millimeters and at the level of the sealing area on the stud side, for example, 2 millimeters.

In an advantageous further development of the invention, at an end on the stud side the sealing element has a geometrical area undercut relative to the axial direction of the sealing element, to enable the form-interlocking connection of an annular dish-shaped plate to the sealing element. Such undercut geometrical areas are also known as undercuts. In this context these are also understood to include such geometrical areas in a component produced by primary forming, which to remove the component from the original mold after its production, entail a partial deformation of the component, in this case the sealing element. In particular, the undercut geometrical area on the stud side extends all the way round.

Expediently, for the interlocking connection of the annular dish-shaped plate the undercut geometrical area on the stud side has an internal groove facing away from the stud-side sealing area and next to it in the axial direction and at the same time facing toward the stud-side sealing area, a bead. In particular the internal groove and/or the bead extend all the way round. This produces in the stud-side undercut geometrical area an inner circumferential surface which, as viewed in an axial section through the central axis of the sealing element, has two part-contours which are orientated perpendicularly to the axial direction of the sealing element in opposite directions.

Preferably the sealing element is essentially solidly designed so that in the fitted condition it restricts deflection movements of a ball stud of the ball joint relative to a housing of the ball joint. Steering or track rods consist mainly of a connecting element, for example a connecting tube, with has a ball joint at each of its two ends. For reasons to do with fitting space steering or track rods often have to be bent, offset or curved in some other way in order to avoid colliding with nearby components or assemblies. The centre of gravity of such curved steering or track rods is as a rule located outside a connecting line through their ends. Thus, ball joints of curved steering or track rods in the fitted condition are often acted upon by a turning moment. The result of this can be that ball studs of the ball joints of such steering or track rods are deflected relative to an undeflected null position. However, deflections of a ball stud away from the null position can only be tolerated provided that during driving operation impacts, i.e. mechanical contact of the ball stud against nearby components such as a housing of the ball joint are avoided. Over time, such mechanical contact would result in mechanical wear or even structural failure, i.e. to the total destruction of the ball joint. While driving over uneven ground the connecting tube of a curved steering or track rod can be excited into vibrations which cause frequent impact between the ball stud and the housing. Such frequent impacts of the ball stud against the housing during driving operation would on the one hand result in increased mechanical wear, as already explained, but on the other hand also produce equally undesirable rattling noises.

The sealing element has an essentially solid design because it is of essentially hollow-cylindrical form. In its essentially solid design the sealing element differs from relatively thin-walled sealing bellows for ball joints. Such sealing bellows, which serve exclusively to provide a simple seal between the housing and the ball stud, as a rule consist of an elastomer material so that the relatively thin walls of such sealing bellows can deform elastically and can follow the deflection movements of the ball stud. Compared with that the essentially solidly formed sealing element differs in having a thickening of the material between the sealing area on the housing side and the sealing area on the stud side, which acts, as it were, as a stop; namely in the area in which the above-mentioned sealing bellows have a relatively thin wall. In particular, the restriction of the deflection movement of the ball stud relative to the housing, at least to some extent, occurs only in the fitted condition of the ball joint. The action of the thicker material as a stop is achieved, apart from by the geometrical form of the thicker material and its arrangement in the fitted condition, also by virtue of a solid structure of the thicker material free from hollow spaces.

In particular the thickened material is above all loaded in compression when acting as a stop to restrict the deflection movement of the ball stud. When the ball joint has been fitted the thicker material is located between the housing and a connected component in contact with the end surface of the sealing element facing away from the housing, and in that position is preferably already under some prestress when the ball stud is in its undeflected position. Since like the sealing element itself the thickened material consists of a plastic material with elastic properties, at the same time the thickened material has a damping effect when it acts as a stop. In this way rattling noises during driving operation are avoided. Preferably, the sealing element and its thicker part are made integrally and consist entirely of the previously mentioned plastic materials.

Advantageously, the outlet opening opens onto an endface of the sealing element on the stud side, its aperture leading into a trench-like annular groove formed in the face on the stud side. The annular groove serves to lead spent lubricant away from an inside space of the ball joint which is at least partially full of spent lubricant. In particular the annular groove has a semicircular cross-section. If the sealing element has a plurality of outlet openings, then in particular all of the outlet openings lead into the trench-like annular groove formed all the way round in the end face on the stud side.

Preferably, the sealing element has at least one trench-like radial lubricant groove formed in an end face on the stud side for draining away the spent lubricant, which groove extends in a straight line in a radial direction perpendicular to the axial direction of the sealing element. In particular the sealing element has a plurality of radial lubricant grooves extending like a star in the radial direction. In particular, the at least one radial lubricant groove communicates with the annular groove of the sealing element. In particular at least one outlet opening, at its open end, leads into a radial lubricant groove. In particular at least one outlet opening, at its open end, opens into a radial lubricant groove and therefore also into the all-round annular groove.

In an advantageous further development of the invention the radial lubricant groove extends into a geometrical area undercut relative to the axial direction of the sealing element on the stud side, which serves for the interlocking connection of an annular dish-shaped plate to the sealing element.

Advantageously, two outer circumferential areas of the sealing element opposite one another in a radial direction of the sealing element that extends perpendicularly to its axial direction are indrawn, in such manner that the outer circumferential areas form a narrowing that extends in the axial direction of the sealing element such that in a radial section through the narrowing the sealing element has an at least essentially elliptical outer circumference. Owing to the special geometrical configuration of the narrowing the extent to which turning moments that occur can be supported, can be adjusted. The axial ends of a sealing element so formed are preferably rotationally symmetrical in order to simplify the connection of the sealing element to the housing of the ball joint and to the annular dish-shaped plate.

Preferably, on an inner circumferential surface which in a fitted condition is in contact with a ball stud of a ball joint, the sealing element has an all-round undulating contour which, in the fitted condition, acts in combination with the ball stud as a gap seal. In that way, in a simple manner an escape of lubricant from the ball joint and at the same time any unintentional wetting of nearby components with lubricant are avoided. The adjacent component concerned is in particular the ball stud, and/or the connected component in contact with the end face of the sealing element facing away from the housing. In particular, the all-round undulating contour is formed with no pitch, i.e. not in the manner of a screw thread. In particular, in a fitted condition crests of the all-round undulating contour rest in contact with the ball stud. In particular the outlet opening, which is in the form of a circumferentially closed through-hole, is farther away perpendicularly to the axial direction from a central axis of the sealing element than is the undulating contour. Thus, the outlet opening also does not engage in the undulating contour but is spatially completely separate from the undulating contour. Such an arrangement has the advantage by virtue of the undulating contour, that besides preventing the undesired escape of lubricant out of the ball joint there is no wetting of the ball stud in the area in which in the fitted condition the undulating contour is in contact with the ball stud.

According to an advantageous further development of the invention, at a stud-side end the sealing element has an all-round annular elastic outer lip in order, in a fitted condition, to prevent dirt from making its way into the ball joint. The annular elastic outer lip is orientated in the axial direction of the sealing element and has an outer circumferential surface which is part of the outer circumferential surface of the sealing element. In particular the annular elastic outer lip extends in the axial direction of the sealing element at the same level as an inner annular elastic lip, which is also orientated in the axial direction of the sealing element and has an inner circumferential surface which is part of an inner circumferential surface of the sealing element. In particular, an aperture of an outlet opening is arranged between the annular elastic outer lip and the annular elastic inner lip. In particular, a volume which in a fitted condition is contained perpendicularly to the axial direction between the annular elastic outer lip and the annular elastic inner lip forms a lubricant reservoir for spent lubricant.

In particular, in a fitted condition the annular elastic outer lip presses all the way round the circumference against a connected component, for example against an essentially flat surface of a steering column lever. In particular, in an assembled condition the annular elastic outer lip acts like a valve through which spent lubricant can be squeezed out of the ball joint, in particular by pressing fresh lubricant into the ball joint. At the same time, particularly by virtue of a prestressing in the axial direction of the sealing element, the valve prevents any penetration of dirt and/or moisture into the ball joint. Thanks to these characteristics such a sealing element can be used for lubricated ball joints and also for low-maintenance ball joints and even for maintenance-free ball joints. In particular, by virtue of being prestressed in the axial direction of the sealing element the annular elastic outer lip compensates any surface unevenness that may exist on the connected component.

Expediently, the sealing area on the housing side has a geometrical area undercut on the housing side relative to the axial direction of the sealing element, to enable the interlocked connection of the sealing element to a housing of the ball joint. In particular, to simplify its assembly the sealing area on the housing side has an all-round inner chamfer. In particular the inner chamfer widens out to an end face on the housing side.

The invention also relates to a ball joint with a sealing element as described above, such that the sealing element is attached securely to the ball joint and, moreover, the ball joint comprises an annular dish-shaped plate fixed securely to the sealing element. Thus, the ball joint and the sealing element and annular dish-shaped plate form a preassembled unit. In particular, the sealing element is fixed to the housing by an interlocking connection. In the context of the present invention an interlocking connection is understood to mean a connection formed by an interlock between at least two joint partners, in this case the housing and the sealing element. Preferably the interlocking connection is designed as a connection that can be assembled without using a tool. This makes it possible to attach the sealing element to the housing in a simple manner. Advantageously, the interlocking connection is a releasable connection which can be separated again without damage to either of the two joint partners. The separation of the connection, i.e. the removal of the sealing element, is preferably likewise also possible without the assistance of tools. This is advantageous particularly in the context of repair work. In particular, the sealing element is fixed to the housing exclusively by virtue of the interlocking connection, i.e. without additional elements which, for example, press the sealing element against the housing in the area of the interlocking connection. In that way the number of components can be kept smaller. In particular the outer circumferential surface of the sealing element in the area of the interlocking connection is free; in other words, for example, it is not wholly or partially enclosed by further structural elements.

Preferably, in the area of the interlocking connection the sealing element is directly in contact with the housing, i.e. for example without an interposed sheet-metal ring. This contributes toward reducing the number of components of the ball joint and therefore the complexity of the assembly process. In particular, the sealing element surrounds the housing in the area of the interlocking connection, in an area in which the ball stud projects out of an opening of the housing also called the stud opening. The interlocking connection can also be designed as a twist-type connection, i.e. an interlocking connection of two components which are first plugged into one another and then rotated relative to one another. The twist-type connection can for example be in the form of a bayonet connection. In the area of the interlocking connection the sealing element can have an unbroken circumference, particularly if the sealing element in this area has relatively high elasticity. Alternatively, in the area of the interlocking connection the sealing element can be interrupted at least at one point on the circumference by a separation open toward the housing. The separation is in the form of a slit, in particular extending in the axial direction of the sealing element. In that way, in the area of the interlocking connection the sealing element can stretch during assembly and if necessary also during dismantling.

In particular, the annular dish-shaped plate is fixed to the sealing element by means of an interlocking connection. In particular, this interlocking connection is designed to be assembled without tools. In particular, the interlocking connection is a releasable connection that can be taken apart again without damage to either or both of the joint partners of the interlocking connection. The separation of the connection, i.e. the dismantling of the annular dish-shaped plate from the sealing element, can also preferably be done without additional help by tools, i.e. in a tool-free manner. In particular the fixing of the annular dish-shaped plate to the sealing element is done exclusively by virtue of the interlocking connection, i.e. without additional elements. In particular, in the area of the interlocking connection the sealing element surrounds the annular dish-shaped plate in an area in which the ball stud projects out of an opening of the sealing element. The interlocking connection can also be designed as a twist-type connection, i.e. an interlocking connection of two components which are first plugged into one another and then rotated relative to one another. The twist-type connection can for example be in the form of a bayonet connection. In the area of the interlocking connection the sealing element can have an unbroken circumference, particularly if the sealing element in this area has relatively high elasticity. Alternatively, in the area of the interlocking connection the sealing element can be interrupted at least at one point on the circumference by a separation open in the direction facing away from the housing. The separation is in the form of a slit, in particular extending in the axial direction of the sealing element.

In particular the ball joint is a lubricated ball joint, or a maintenance-free ball joint factory-lubricated for its lifetime, or a ball joint designed to have prolonged maintenance intervals. In particular the ball joint is suitable for a chassis of a motor vehicle; for example a utility vehicle for the transport of people and/or goods, or a self-driving agricultural or forestry machine or a self-driving building machine. A characteristic feature of a lubricated ball joint is as a rule a lubrication nipple through which lubricant can be introduced into an inside space of the ball joint through a housing wall or through a cover of the ball joint. In particular, the ball joint is a radial ball joint. Radial ball joints are used for example for steering rods or track rods of motor vehicles, particularly utility vehicles. The central axis of the undeflected ball stud of the radial ball joint extends in its axial direction, which in particular coincides with the axial direction of the sealing element. The radial ball joint is designed particularly to withstand loads perpendicular to its axial direction, i.e. in the radial direction. Radial ball joints often comprise a shaft made integrally with the housing that extends away essentially perpendicularly to its axial direction, which is provided for example for connection to a steering rod or a track rod of a utility vehicle. Radial ball joints are often also called angled ball joints or simply angled joints.

In particular the ball stud is fitted into the housing so that it can not only be deflected in the sense of pivoting, but at the same time also rotated relative to the housing. In connection with the present invention a deflection movement of the ball stud relative to the housing is understood to mean that the ball stud moves away from an undeflected null position in which it is arranged centrally in a stud opening of the housing. Out of the stud opening of the housing the ball stud extends with a shank portion, whereas another part of the ball stud which carries a ball remains inside the housing. Besides the stud opening the housing can have axially opposite a further opening, which is preferably closed by a cover and is therefore called the cover opening. The cover can have a centrally arranged lubrication nipple, or it can be closed, i.e. without a lubrication nipple. Alternatively, a lubrication nipple can also be let into a sidewall of the housing.

In particular the ball joint is suitable for fitting into a motor vehicle, particularly in a chassis and/or a steering system of a motor vehicle. The ball stud consists of a joint ball fitted into the housing and a stud attached solidly thereto, such that the stud can be partially of conical shape and extends out of the housing through a housing opening on the stud side. The ball stud can be made integrally or in more than one part as a so-termed assembled ball stud with a separate joint ball and, connected solidly thereto, a separate stud. The sealing element is positioned with its sealing area on the housing side in the area of the housing opening on the stud side, in particular forming a seal against the housing. With its stud-side sealing area the sealing element in the assembled condition of the ball joint is positioned so as to form a seal against the shank of the ball stud. In particular, the annular dish-shaped plate is connected to the sealing element with interlock. In particular, the interlocking connection of the annular dish-shaped plate is in the form of a snap-on connection. In particular, the annular dish-shaped plate is a dish-shaped plate made of steel sheet, particularly one formed by a deep-drawing process.

Preferably, the annular dish-shaped plate has a smaller outer diameter than the sealing element. By virtue of such a protected arrangement of the annular dish-shaped plate damage due to overlapping areas of the annular dish-shaped plate during the assembly of the ball joint or when fitting the ball joint into a vehicle can be avoided. Furthermore, the risk of injury is reduced. This aspect is particularly important when the annular dish-shaped plate is a steel sheet component because cut edges of such sheet components are as a rule not free from burrs.

Advantageously, to produce the secure attachment an all-round collar of the annular dish-shaped plate engages with interlock in the stud-side undercut geometrical area, specifically in an internal groove of the stud-side geometrical area of the sealing element. In particular, with this secure attachment by which the annular dish-shaped plate is securely connected to the sealing element, the all-round collar is completely contained within the also all-round internal groove. This design further reduces the risk of injury.

Expediently, a gap remains between the all-round collar and the internal groove to allow spent lubricant to flow through. In particular, this gap continues between the bead of the stud-side geometrical area and the annular dish-shaped plate.

According to an advantageous further development of the invention, at its inner circumference the annular dish-shaped plate has an all-round bead by which the outlet opening is at least partially blocked. Thanks to this bead the entry of contamination into the inside space of the ball joint is prevented or at least made more difficult.

The invention further relates to a two-point control arm with a ball joint as described earlier, wherein the two-point control arm is in the form of a steering rod or a track rod. The transmission of a steering movement from a steering wheel to vehicle wheels takes place in utility vehicles as a rule via a steering rod system comprising in each case at least one track rod and a steering rod. In the context of the invention, in the assembled condition in the utility vehicle the track rod extends at least essentially in the direction transverse to the vehicle and connects a track lever of a wheel carrier on a first side of the vehicle to a track lever on the opposite side of the vehicle. In the context of the invention, in its fitted condition in the utility vehicle the steering rod extends essentially in the longitudinal direction of the vehicle and can for example connect a steering column lever of a steering gear system to a steering lever of a wheel carrier. In particular the two-point control arm is a bent or offset steering or track rod, or one curved in some other way.

BRIEF DESCRIPTION OF THE DRAWINGS

Below, the invention is explained in greater detail with reference to embodiments shown only as examples in the drawings, in which the same indexes relate to the same components or elements and which show.

DETAILED DESCRIPTION OF THE PREFERRED EMBODIMENTS

Figure 1:
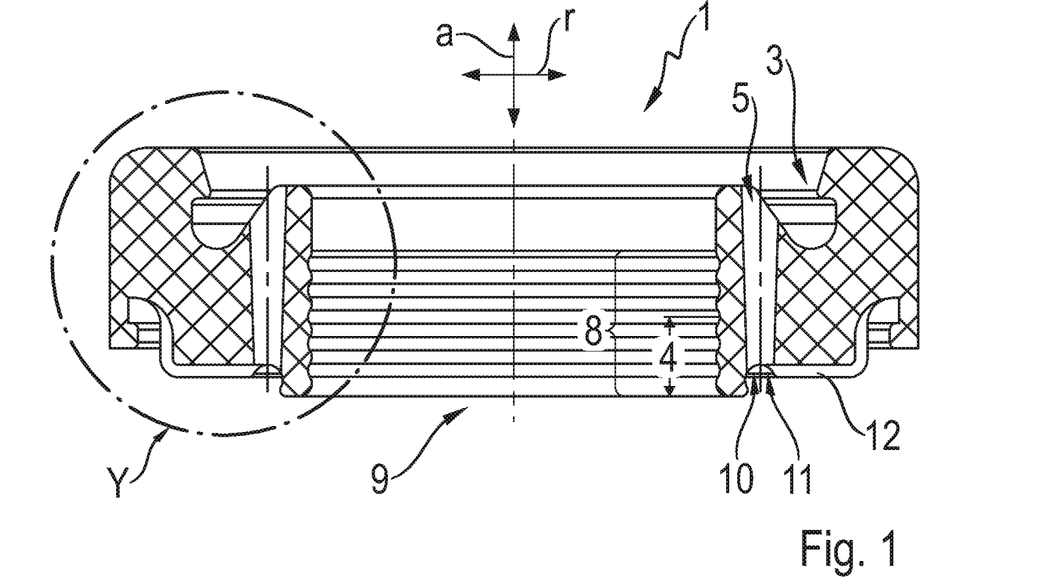
FIG. 1: A sectioned representation of a sealing element according to a first embodiment of the invention.

FIG. 1 shows a sealing element 1 for a lubricated ball joint 2, wherein the sealing element 1 consists of polyurethane (PUR) and is made by an injection molding process. The sealing element 1 has a sealing area 3 on the housing side and a sealing area 4 on the stud side a distance away from it in an axial direction a. In addition the sealing element 1 has six outlet openings 5 arranged between the housing-side sealing area 3 and the stud-side sealing area 4, which therefore extend through the sealing element 1 to allow the passage of spent lubricant. The outlet openings 5, of which only two can be seen in the figure, extend in a straight line in the axial direction a of the sealing element 1 and pass completely through the sealing element 1 in its axial direction a in such manner that if the sealing element 1 were viewed in its axial direction a, one could see through the outlet openings 5. Furthermore, the outlet openings 5 extend in the axial direction a of the sealing element 1 essentially from the housing-side sealing area 3 to the stud-side sealing area 4. The outlet openings 5 are in the shape of slim truncated cones and each has an inside surface that has not been machined. At the level of the housing-side sealing area 3 the outlet openings each have a diameter of 3 millimeters and at the level of the stud-side sealing area 4 a diameter of 2 millimeters.

The sealing element 1 is essentially of solid structure so that when fitted, it restricts deflection movements of a ball stud 6 of the ball joint 2 relative to a housing 7 of the ball joint 2. Furthermore, on an inner circumferential surface which when fitted is in contact with the ball stud 6 the sealing element 1 has an all-round undulating contour 8 which, in the fitted condition, acts as a gap seal in combination with the ball stud 6 of the ball joint 2. On a stud-side end face 9 of the sealing element 1 the outlet openings each lead with an aperture 10 into a trench-like all-round annular groove 11 formed in the stud-side end face 9 of the sealing element 1. Also formed in the stud-side end face 9 there are four trench-like radial lubricant grooves 12 for draining spent lubricant away, which grooves extend straight in a radial direction r perpendicular to the axial direction a of the sealing element 1.

Figure 2:
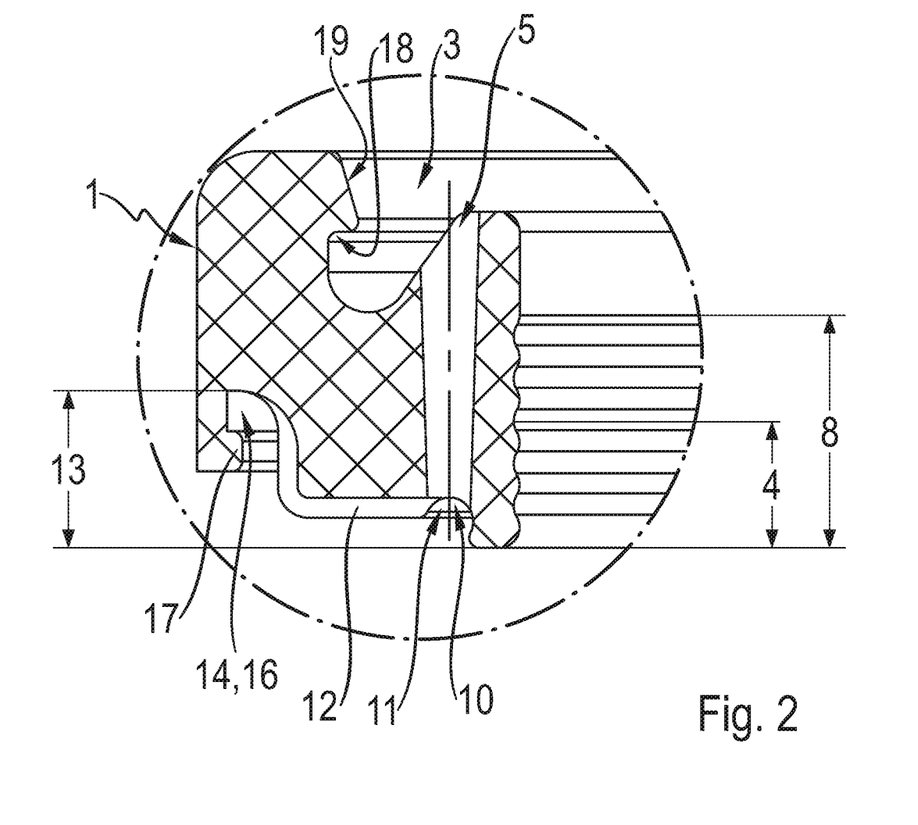
FIG. 2: An enlarged view of the detail Y in FIG. 1.

FIG. 2 shows that the sealing element 1 has at a stud-side end 13 a geometrical area 14 which is undercut relative to the axial direction a of the sealing element 1, to enable the interlocking connection of an annular dish-shaped plate 15 to the sealing element 1. It can also be seen that the stud-side undercut geometrical area 14 for the interlocking connection of the annular dish-shaped plate 15 has an inner groove 16 facing away from the stud-side sealing area 4 in the radial direction r and adjacent to it in the axial direction a and at the same time a bead 17 facing toward the stud-side sealing area 4 in the radial direction r. The radial lubricant groove 12 opens into the stud-side undercut geometrical area 14. Furthermore, it can be seen that the housing-side sealing area 3 has a housing-side geometrical area 18 undercut relative to the axial direction a of the sealing element 1 to enable the interlocking connection of the sealing element 1 to the housing 7 of the lubricated ball joint 2. To simplify the assembly of the sealing element 1, the housing-side sealing area 3 has an all-round inner chamfer 19 which widens out toward an end face on the housing side.

Figure 3:
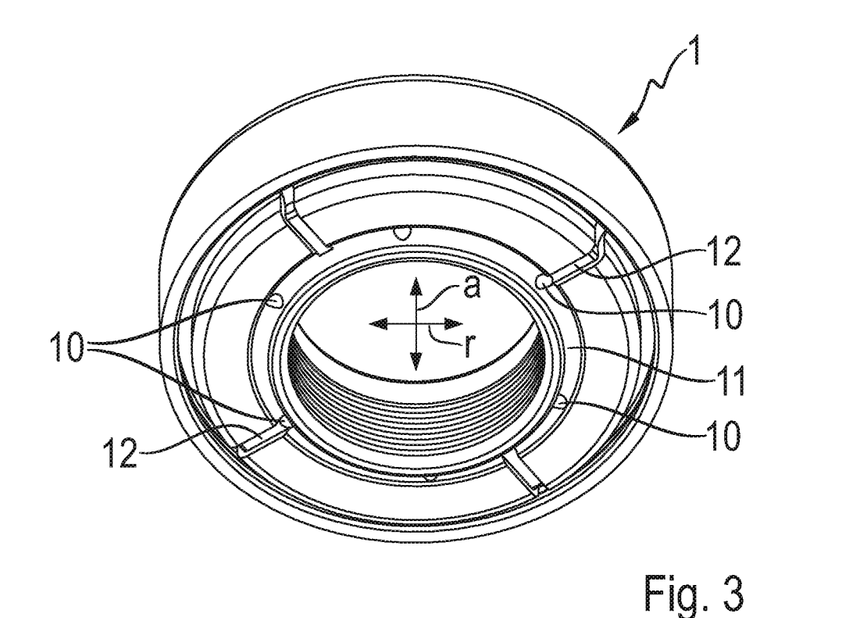
FIG. 3: A perspective view from below of the sealing element in FIG. 1.
Figure 4:
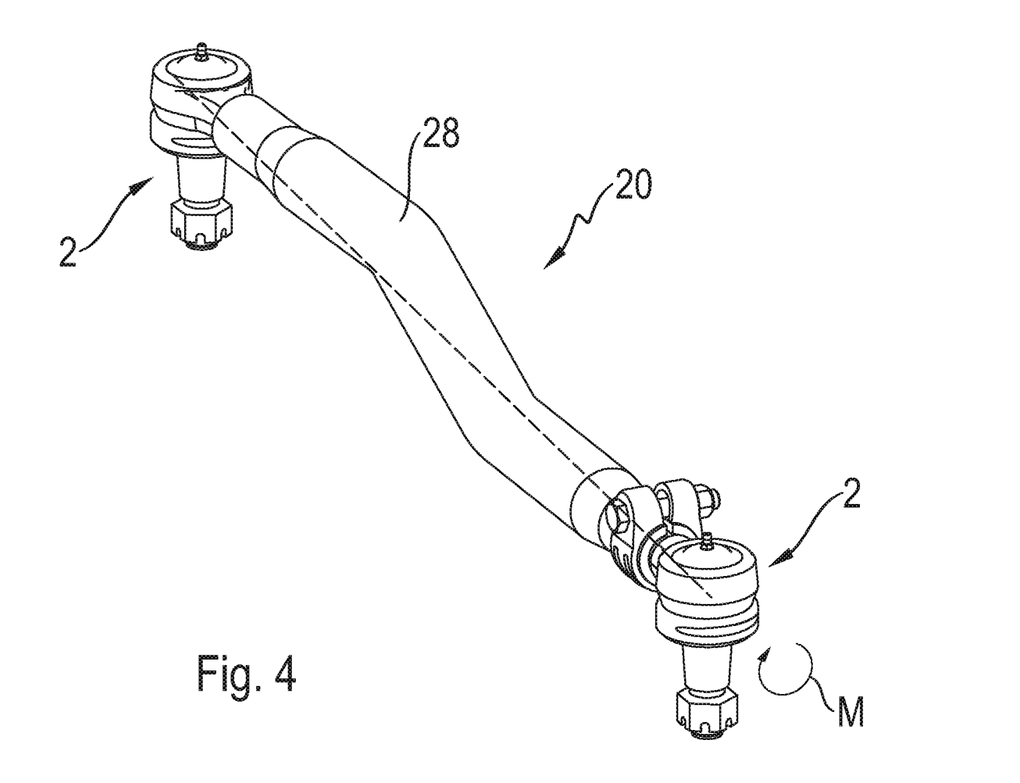
FIG. 4: A perspective view of a two-point control arm according to the invention.

In FIG. 3 it can be seen that two outlet openings 5 opposite one another in the radial direction r open with their apertures 10 each into a radial lubricant groove 12 and at the same time into the all-round annular groove 11. FIG. 4 shows a two-point control arm 20 with two respective lubricated ball joints 2 at its ends, the two-point control arm being in the form of a length-adjustable steering rod 20. For reasons of fitting space the steering rod 20 is bent so that in a fitted condition collisions with nearby components are avoided. Owing to its bent shape the center of gravity 28 of the steering rod 20 is located away from a connection line, indicated by the broken line, that passes through the two ball joints 2 arranged at the ends of the steering rod 20. Due to this geometrical configuration, in its fitted condition the steering rod 20 is acted upon by a turning moment M.

Figure 5:
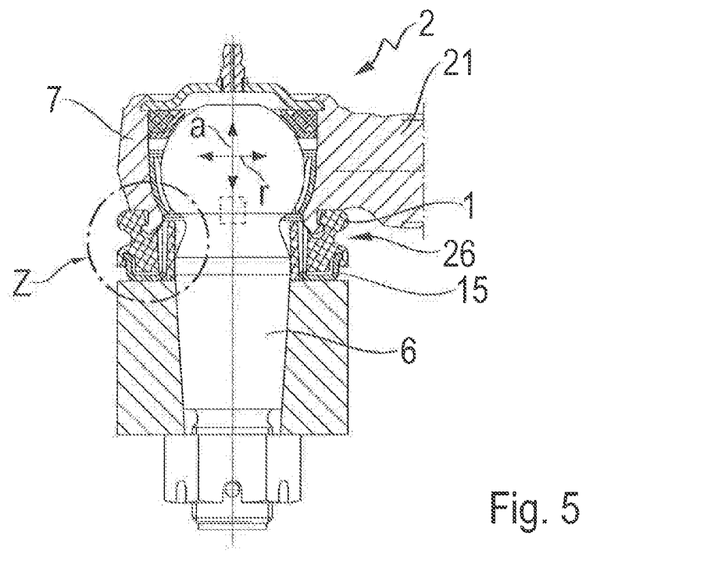
FIG. 5: A sectioned representation of a lubricated ball joint from FIG. 4 with a sealing element according to a second embodiment of the invention.

FIG. 5 shows one of the two lubricated ball joints 2 in FIG. 4, wherein a sealing element 1 is connected securely to the ball joint 2 and wherein, furthermore, the ball joint 2 also comprises an annular dish-shaped plate 15 fixed securely on the sealing element 1. A ball stud 6 of the ball joint 2 is shown in a non-deflected null position, in which a central axis of the ball stud 6 extends in an axial direction that coincides with the axial direction a of the sealing element 1. A partially represented shank 21 formed integrally with a housing 7 of the ball joint 2 extends in a radial direction r, perpendicularly to the axial direction a, and for that reason the ball joint is also called a radial ball joint 2. The shank 21 serves for connecting the radial ball joint 2 to a connecting tube of the steering rod 20 in FIG. 4. A conical area of the ball stud 6 is clamped by a crown nut via a cone connection rotationally fixed to a steering column lever. The housing 7 has an all-round annular groove in which there engages with interlock a bead of a housing-side undercut geometrical area 18 of the sealing element 1 provided with an inner chamfer 19 in order to produce the aforesaid secure connection. Two outer circumferential areas of the sealing element 1 opposite one another in the radial direction r have an in-drawn shape such that these outer circumferential areas form a narrowing 26 that extends in the axial direction a of the sealing element 1. Thanks to this narrowing 26, the resistance against deflection of the ball stud 6 away from its null position is lower compared with the circumferential areas of the sealing element 1 that have no narrowing 26.

Figure 6:
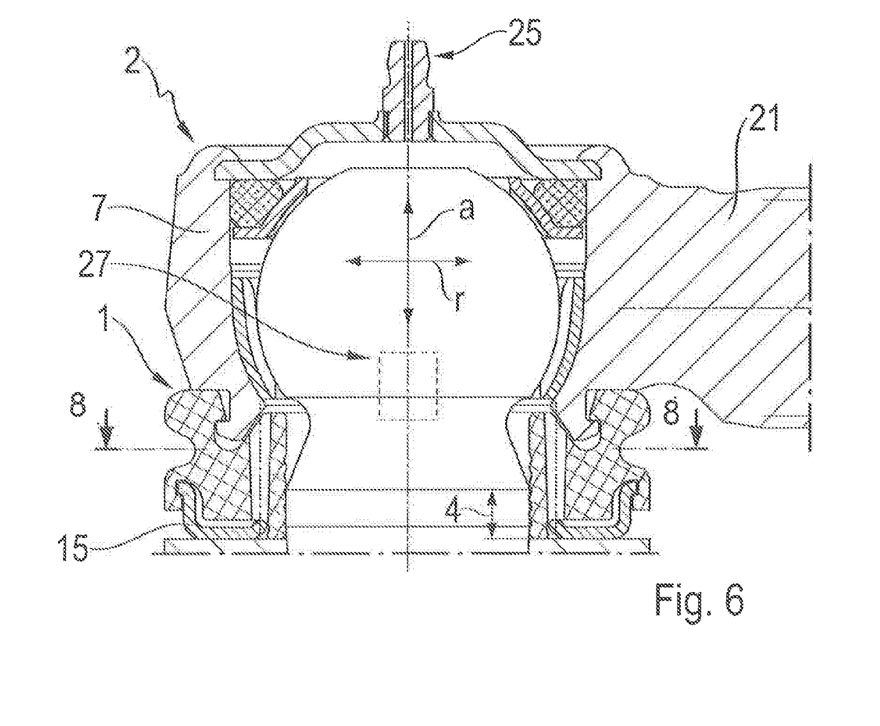
FIG. 6: An enlarged sectioned view of part of the ball joint in FIG. 5.

In FIG. 6 it can be seen that the annular dish-shaped plate 15 has a smaller outer diameter than the sealing element 1. The ball joint 2 has a lubrication nipple 25 through which fresh lubricant can be fed into the ball joint 2. Furthermore the ball joint 2 has a schematically indicated rotation prevention device 27 which comprises a part on the housing side and a part on the sealing element side. The housing-side part is formed integrally with the housing 7 and the sealing element part integrally with the sealing element 1. The two parts engage in one another with interlock to prevent any rotation of the sealing element 1 relative to the housing 7. The rotation prevention device 27 ensures that the above-mentioned deflection of the ball stud 6, which is favored by the narrowing 26, is always allowed only in the same, predefined direction with no fear of collision with nearby components. In this case the same, predefined direction is along the longitudinal direction of the steering rod 20. The two outer circumferential areas arranged opposite one another in the radial direction r and at the same time drawn inward, which form the narrowing 26 of the sealing element 1, are therefore aligned with the longitudinal direction of the steering rod 20 as can be seen in FIG. 4. In contrast, two areas of the sealing element 1 offset in the circumferential direction of the sealing element 1 by 90 degrees relative to the oppositely arranged and at the same time drawn-in outer circumferential areas are not narrowed but are solidly formed so as to be able to support the turning moment M during driving operation.

Figure 7:
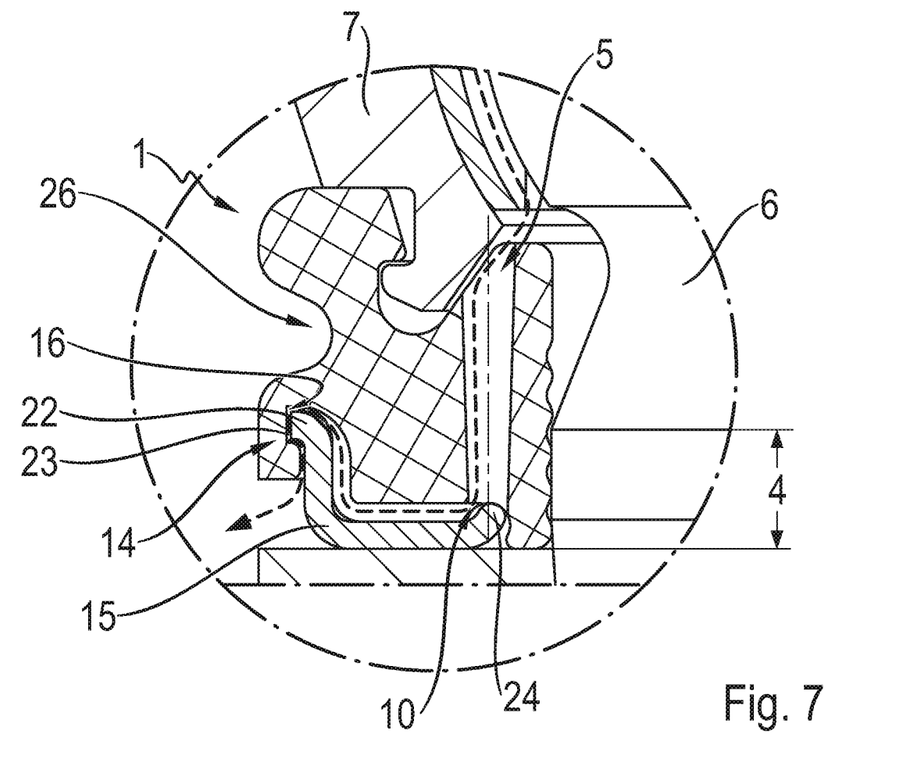
FIG. 7: An enlarged view of the detail Z in FIG. 5.

As can be seen in FIG. 7, to produce the secure connection an all-round collar 22 of the dish-shaped plate 15 engages in an inner groove 16 of a stud-side undercut geometrical area 14 of the sealing element 1. Between the all-round collar 22 and the inner groove 16 there remains a gap 23 to allow the passage of spent lubricant. At its inside circumference the annular dish-shaped plate 15 has an all-round bead 24 by which an outlet opening 5 is partially blocked. More precisely, an aperture 10 of the outlet opening 5 is partially blocked. The broken line indicates the path that the spent lubricant must follow in order to emerge from the ball joint 2. For this, the spent lubricant is displaced by fresh lubricant fed into the ball joint 2 through the lubrication nipple 25.

Figure 8:
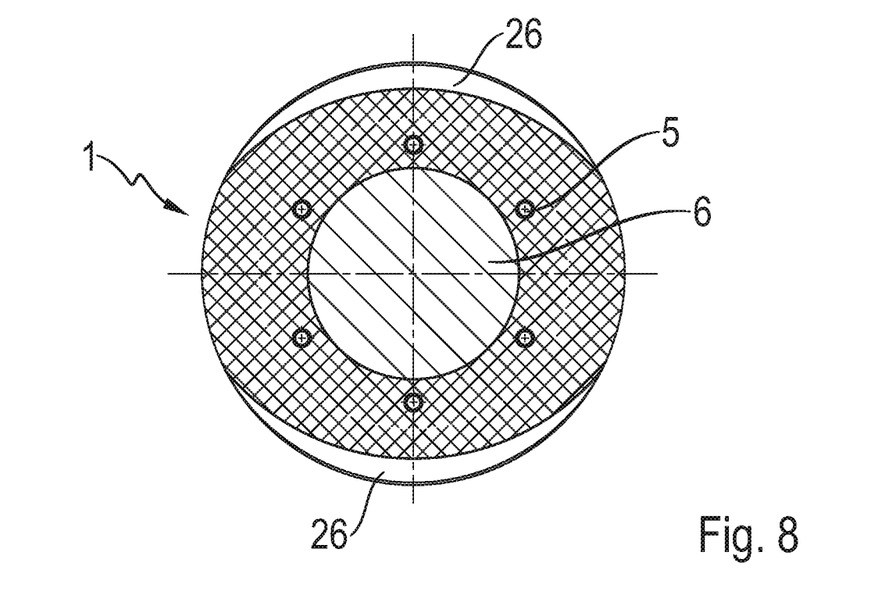
FIG. 8: A sectioned view along the section 8-8 in FIG. 6.

FIG. 8 shows the two outer circumferential areas of the sealing element 1 opposite one another in the radial direction r and at the same time drawn in to form the above-mentioned narrowing 26. In the section through the narrowing 26 shown, the outer contour of the sealing element 1 is essentially elliptical.

Figure 9:
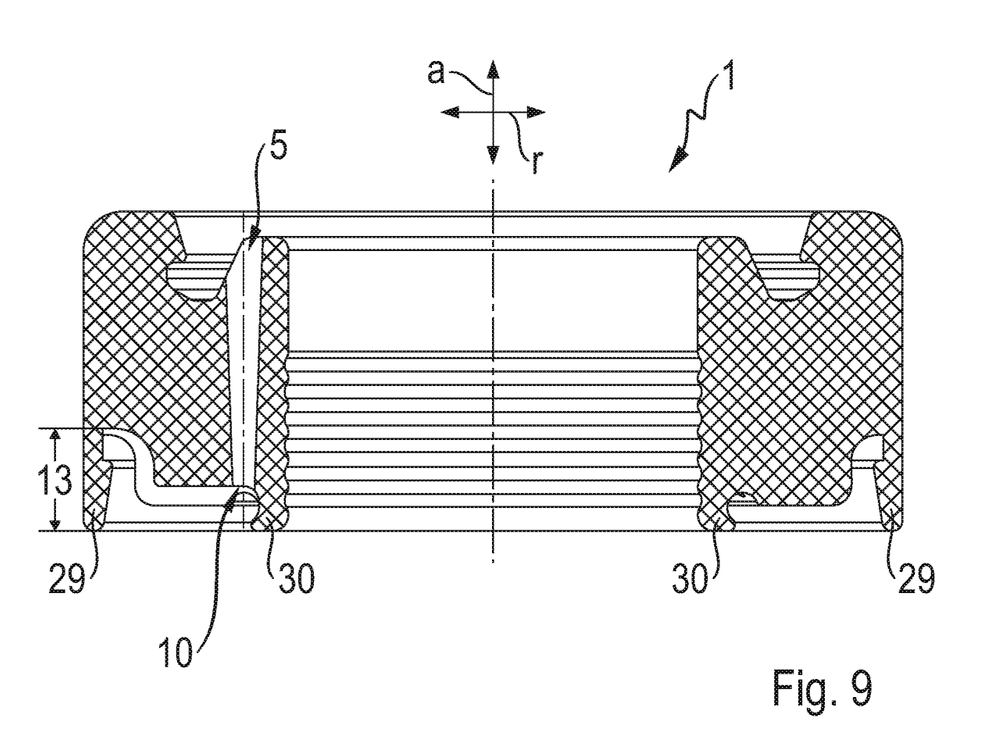
FIG. 9: A sectioned representation of a sealing element according to a third embodiment of the invention.

FIG. 9 shows a sealing element 1 which, at a stud-side end 13, has an all-round annular outer elastic lip 29 so that in the fitted condition it will prevent any entry of dirt into the ball joint 2. The annular outer elastic lip 29 is orientated in the axial direction a of the sealing element 1 and has an outer circumferential surface which is part of an outer circumferential surface of the sealing element 1. The annular outer elastic lip 29 extends in the axial direction a of the sealing element 1 at the same height as an annular inner elastic lip 30 which is also orientated in the axial direction a of the sealing element 1, and which has an inner circumferential surface which is part of the inner circumferential surface of the sealing element 1. An aperture 10 of an outlet opening bis arranged between the annular outer elastic lip 29 and the annular inner elastic lip 30. The sealing element 1 can be used both for the lubricated ball joint 2 and for low-maintenance and maintenance-free ball joints.

INDEXES

1 Sealing element
2 Lubricated ball joint, lubricated radial ball joint
3 Sealing area on the housing side
4 Sealing area on the stud side
5 Outlet opening
6 Ball stud
7 Housing of the lubricated ball joint
9 Undulating contour
9 End face on the stud
10 Aperture of the outlet opening
11 All-round annular groove
12 Radial lubricant groove
13 End of the sealing element on the stud side
14 Undercut geometrical area on the stud side
15 Annular dish-shaped plate
16 Inner groove
17 Bead 18 Undercut geometrical area on the housing side
19 Inner chamfer
20 Two-point control arm, steering rod
21 Shank
22 Collar of the annular dish-shaped plate
23 Gap
24 AH-round bead
25 Lubrication nipple
26 Narrowing
27 Secure connection
28 Center of gravity
29 Annular outer elastic lip
30 Annular inner elastic lip
a Axial direction
r Radial direction
M Turning moment

The invention claimed is:

1. A sealing element for a ball joint, the sealing element comprising:
a sealing area on a housing side and a sealing area on a stud side a distance away therefrom in an axial direction of the sealing element, and an outlet opening is arranged between the sealing area on the housing side and the sealing area on the stud side and extends through the sealing element to allow passage of spent lubricant, the outlet opening extends in the axial direction of the sealing element, passing completely through the sealing element in the axial direction thereof, an axial end of the sealing element, on the stud side, has an annular inner groove which receives an annular dish-shaped plate, and the annular dish-shaped plate has an all-round bead on an inside circumference thereof which at least partially blocks the outlet opening.

2. The sealing element according to claim 1, wherein the outlet opening in the axial direction of the sealing element extends substantially from the sealing area on the housing side to the sealing area on the stud side and the outlet opening forms an aperture on the stud side that is at least partially blocked by the annular dish-shaped plate.

3. The sealing element according to claim 1, wherein the outlet opening is in a shape of either a truncated cone or frustum.

4. The sealing element according to claim 1, wherein the sealing element has at the axial end on the stud side, a stud-side geometrical area undercut relative to the axial direction of the sealing element, to enable interlocking connection of the annular dish-shaped plate to the sealing element.

5. The sealing element according to claim 4, wherein to enable the interlocking connection of the annular dish-shaped plate, the geometrical area undercut comprises the inner groove which is radially opposite from the sealing area on the stud side and, adjacent to the geometrical area in the axial direction, and a bead faces toward the sealing area on the stud side.

6. The sealing element according to claim 1, wherein the sealing element is solidly formed so that, in a fitted condition, the sealing element will restrict deflection movements of a ball stud of the ball joint relative to a housing of the ball joint.

7. The sealing element according to claim 1, wherein the outlet opening has an aperture at an end face at the axial end of the sealing element on the stud side that opens in a trench-like annular groove (11) of the sealing element formed in the end face on the stud side.

8. The sealing element according to claim 7, wherein in the end face on the stud side the sealing element has at least one radial lubricant groove formed to enable spent lubricant to drain away, the radial lubricant groove extending from the annular groove straight in a radial direction perpendicular to the axial direction of the sealing element.

9. The sealing element according to claim 8, wherein the radial lubricant groove opens into a geometrical area of the sealing element undercut relative to the axial direction thereof on the stud side, which serves to enable interlocking connection of the annular dish-shaped plate to the sealing element.

10. The sealing element according to claim 1, wherein two outer circumferential areas of the sealing element opposite one another in a radial direction of the sealing element perpendicular to the axial direction thereof are drawn in, in such a manner that the outer circumferential areas form a narrowing that extends in the axial direction of the sealing element, and as a result, in a radial section through the narrowing the sealing element has a substantially elliptical outer circumference.

11. The sealing element according to claim 1, wherein on an inner circumferential surface which in a fitted condition is in contact with a ball stud, the sealing element has an all-round undulating contour which, in the fitted condition, forms in combination with the ball stud a gap seal.

12. The sealing element according to claim 1, wherein the sealing area on the housing side has a geometrical area undercut relative to the axial direction of the sealing element, to enable interlocking connection of the sealing element to a housing of a lubricated ball joint.

13. The sealing element according to claim 1, wherein at the axial end on the stud side the sealing element has an all-round, annular outer elastic lip which, in a fitted condition of the sealing element, prevents any entry of dirt into the ball joint, the annular outer elastic lip being orientated in the axial direction of the sealing element and the annular outer elastic lip having a radially outer circumferential surface which aligns with a radially outer circumferential surface of the sealing element.

14. A ball joint with a sealing element having a sealing area on a housing side and a sealing area on a stud side a distance away therefrom in an axial direction of the sealing element, and an outlet opening is arranged between the sealing area on the housing side and the sealing area on the stud side and extends through the sealing element to allow passage of spent lubricant, the outlet opening extends in the axial direction of the sealing element, passing completely through the sealing element in the axial direction thereof, and the sealing element is securely fixed onto the ball joint and the ball joint comprises an annular dish-shaped plate securely connected to the sealing element, and the annular dish-shaped plate has an all-round bead on an inside circumference thereof, wherein the dish-shaped plate is received within an annular inner groove in an axial end of the sealing element on the stud side such that the all-round bead at least partially blocks the outlet opening.

15. The ball joint according to claim 14, wherein the annular dish-shaped plate has a smaller outer diameter than the sealing element.

16. The ball joint according to claim 14, wherein to produce the secure connection an all-round collar of the annular dish-shaped plate engages with interlock in the inner groove, and the inner groove being formed at an undercut geometrical area on the stud side of the sealing element.

17. The ball joint according to claim 16, wherein a gap remains between the all-round collar and the inner groove to allow passage of spent lubricant.

18. A two-point control arm with a ball joint having a sealing element that has a sealing area on a housing side and a sealing area on a stud side a distance away therefrom in an axial direction of the sealing element, and an outlet opening is arranged between the sealing area on the housing side and the sealing area on the stud side and extends through the sealing element to allow passage of spent lubricant, the outlet opening extends in the axial direction of the sealing element, passing completely through the sealing element in the axial direction thereof, and the sealing element is securely fixed onto the ball joint and the ball joint comprises an annular dish-shaped plate securely connected to the sealing element, and the two-point control arm is in the form of either a steering rod or a track rod, an axial end of the sealing element on the stud side has an annular inner groove which receives an annular dish-shaped plate, and the annular dish-shaped plate has an all-round bead on an inside circumference thereof which at least partially blocks the outlet opening.

\* \* \* \* \*